(12) United States Patent
Mochizuki

(10) Patent No.: US 8,991,905 B2
(45) Date of Patent: Mar. 31, 2015

(54) FLOOR STRUCTURE IN VEHICLE BODY REAR PART

(75) Inventor: Shinei Mochizuki, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 14/241,599

(22) PCT Filed: May 21, 2012

(86) PCT No.: PCT/JP2012/062886

§ 371 (c)(1),
(2), (4) Date: Feb. 27, 2014

(87) PCT Pub. No.: WO2013/054565

PCT Pub. Date: Apr. 18, 2013

(65) Prior Publication Data

US 2014/0232141 A1    Aug. 21, 2014

(30) Foreign Application Priority Data

Oct. 14, 2011  (JP) .................................. 2011-226832

(51) Int. Cl.
    *B62D 25/20*    (2006.01)
(52) U.S. Cl.
    CPC ............ *B62D 25/20* (2013.01); *B62D 25/2027* (2013.01)
    USPC ......... 296/193.07; 296/29; 296/204; 296/209
(58) Field of Classification Search
    USPC ............. 296/187.03, 187.11, 187.08, 187.12, 296/193.08, 204, 205, 209, 193.07, 203.03, 296/29
    IPC ...................................... B62D 25/20
    See application file for complete search history.

(56) References Cited

U.S. PATENT DOCUMENTS

| 4,557,519 | A  | * | 12/1985 | Matsuura ....................... 296/204 |
| 4,712,829 | A  | * | 12/1987 | Hurten et al. ............. 296/203.02 |
| 6,666,501 | B1 | * | 12/2003 | Logan et al. ............. 296/193.07 |
| 8,287,032 | B2 | * | 10/2012 | Mori ........................ 296/187.08 |
| 2005/0189791 | A1 | * | 9/2005 | Chernoff et al. ......... 296/193.07 |

FOREIGN PATENT DOCUMENTS

| JP | 03129573 U | 12/1991 |
| JP | 04043176 A | 2/1992 |

(Continued)

OTHER PUBLICATIONS

International Search Report for Application No. PCT/JP2012/062886 dated Aug. 14, 2012.

*Primary Examiner* — Pinel Romain

(74) *Attorney, Agent, or Firm* — Lerner, David, Littenberg, Krumholz & Mentlik, LLP

(57) ABSTRACT

A vehicle body rear floor structure characterized as follows is provided. The front end of a rear floor panel in a vehicle longitudinal direction includes a front wall extending between a pair of side sills. The front wall forms an arc whose central part in a vehicle width direction projects upward from the floor. The front wall lower end is joined to a rear end of a main floor panel. A cross member forms an arc whose central part in the vehicle width direction projects upward from the floor, and extends along the front wall with the central part of the cross member in the vehicle width direction placed on a floor tunnel. The cross member ends, in the vehicle width direction, are joined to the side sills and main floor panel. The cross member central part in the vehicle width direction is joined to the floor tunnel.

4 Claims, 5 Drawing Sheets

(56) References Cited

FOREIGN PATENT DOCUMENTS

| JP | 07165124 | 6/1995 |
|---|---|---|
| JP | 07323866 | 12/1995 |
| JP | 2004345389 A | 12/2004 |
| JP | 2010030546 A | 2/2010 |
| JP | 2010159045 A | 7/2010 |
| JP | 2011136622 A | 7/2011 |

* cited by examiner

FLOOR STRUCTURE IN VEHICLE BODY REAR PART

CROSS REFERENCE TO RELATED APPLICATIONS

The present application is a national phase entry under 35 U.S.C. §371 of International Application No. PCT/JP2012/062886, filed May 21, 2012, published in Japanese, which claims priority from Japanese Patent Application No. 2011-226832 filed Oct. 14, 2011, all of which are hereby incorporated herein by reference.

TECHNICAL FIELD

The present invention relates to a floor structure in vehicle body rear part.

BACKGROUND ART

A floor structure in vehicle body rear part has been conventionally known in which a step part is formed between a main floor panel and a rear floor panel of a vehicle cabin. A cross member extending in a vehicle width direction is arranged at a position of the step part so as to enhance the floor strength.

Patent Document 1 discloses a structure in which two cross members makes a joint in a step part between a main floor panel and a rear floor panel. In Patent Document 1, a front cross member and a rear cross member are combined to form a closed cross section, and the members having the closed cross section connect the main floor panel and the rear floor panel.

In another example, Patent Document 2 discloses a structure in which cross members bent in center portions thereof in the vehicle width direction are arranged in a step part between a main floor panel and a rear floor panel.

PRIOR ART DOCUMENTS

[Patent Document 1] Japanese Patent Application Publication No. 2010-159045
[Patent Document 2] Japanese Patent Application Publication No. 2011-136622

SUMMARY OF THE INVENTION

Technical Problem

The structure in Patent Document 1 is designed such that the main floor panel and the rear floor panel are not directly joined to each other but are joined via the separate members (the cross members). For this reason, Patent Document 1 has a problem that the main and rear floor panels have a weak joint strength and are likely to be deformed when a load is applied therebetween.

In addition, in each of the structures in Patent Documents 1 and 2, each of end parts of each cross member in the vehicle width direction is connected to only one member (such as a rocker inner) in a side part in the vehicle width direction. Thus, vibrations in up-down directions transmitted to the main floor panel cannot be reduced at the positions of the side parts in the vehicle width direction, which might consequently cause vibrations and noise in the vehicle cabin.

An object of the present invention is to provide a floor structure in vehicle body rear part making it possible to enhance the joint strength between a main floor panel and a rear floor panel and to reduce vibrations in the up-down directions transmitted to the main floor panel and the like.

Means for Solving the Problem

In order to solve the above problem of the conventional technique, the present invention provides a floor structure in vehicle body rear part in which a pair of side sills extending in a vehicle longitudinal direction are respectively arranged on sides, in a vehicle width direction, of a main floor panel and a rear floor panel which form front and rear floors of a vehicle cabin, a floor tunnel projecting upward extends in the vehicle longitudinal direction at a central part of the main floor panel in the vehicle width direction, a front end part of the rear floor panel in the vehicle longitudinal direction is connected to a rear end part of the main floor panel, and a cross member extending between the pair of side sills is arranged at a position at which the main floor panel and the rear floor panel are connected, wherein the front end part of the rear floor panel in the vehicle longitudinal direction includes a front wall part extending between the pair of side sills, the front wall part formed into an arc shape whose central part in the vehicle width direction projects upward in a vehicle front view, and having a lower end part joined to the rear end part of the main floor panel, the cross member is formed into an arc shape whose central part in the vehicle width direction projects upward in the vehicle front view, and is arranged to extend along the front wall part with the central part of the cross member in the vehicle width direction placed on the floor tunnel, end parts of the cross member in the vehicle width direction are joined to the pair of side sills and the main floor panel, and the central part of the cross member in the vehicle width direction is joined to the floor tunnel.

Moreover, according to an embodiment of the present invention, a lower end of the central part of the front wall part in the vehicle width direction includes a first flange extending toward a vehicle front, the central part of the cross member in the vehicle width direction includes a center flange extending toward the vehicle front, the first flange of the front wall part and the center flange of the cross member are arranged on the floor tunnel while overlapping in this order from the top, and three of the floor tunnel, the first flange of the front wall part, and the center flange of the cross member are joined to one another by welding.

Furthermore, according to another embodiment of the present invention, a pair of side members extending in the vehicle longitudinal direction are arranged below the main floor panel, each of the pair of side members reaches a position at which a corresponding one of the end parts of the cross member in the vehicle width direction is joined to the main floor panel, and three of the cross member, the main floor panel, and the side member are joined to one another by welding.

Effects of the Invention

A floor structure in vehicle body rear part according to the present invention provides a floor structure in vehicle body rear part in which a pair of side sills extending in a vehicle longitudinal direction are respectively arranged on sides, in a vehicle width direction, of each of a main floor panel and a rear floor panel which form front and rear floors of a vehicle cabin, a floor tunnel projecting upward extends in the vehicle longitudinal direction at a central part of the main floor panel in the vehicle width direction, a front end part of the rear floor panel in the vehicle longitudinal direction is connected to a rear end part of the main floor panel, and a cross member extending between the pair of side sills is arranged at a position at which the main floor panel and the rear floor panel are connected. In the floor structure in vehicle body rear part, a front wall part extending between the pair of side sills is provided to the front end part of the rear floor panel in the vehicle longitudinal direction, the front wall part is formed into an arc shape in such a manner that a central part thereof in the vehicle width direction projects upward in a vehicle front view, a lower end part of the front wall part is joined to the rear end part of the main floor panel, the cross member is formed into an arc shape in such a manner that a central part thereof in the vehicle width direction projects upward in the vehicle front view, and is arranged in such a manner as to extend along the front wall part, the central part of the cross member in the vehicle width direction is placed on the floor tunnel, end parts in the vehicle width direction of the cross member are joined to the pair of side sills and the main floor panel, and the central part in the vehicle width direction of the cross member is joined to the floor tunnel.

According to the present invention, the main floor panel and the rear floor panel are directly joined to each other, and the cross member having the same shape as that of the front wall part of the rear floor panel is arranged along the front wall part. Thus, the cross member and the front wall part enhance the rigidity in cooperation with each other, and thereby it is possible to reduce deformation occurring when a load is applied to a portion where the main floor panel and the rear floor panel are joined to each other.

In addition, since the front wall part of the rear floor panel and the cross member are formed into the arc shape projecting upward in the vehicle front view, the cross member and the front wall part can reduce, in cooperation with each other, vibrations in the up-down directions of the main floor panel and the rear floor panel. Besides, each end part of the cross member in the vehicle width direction is joined to the two members which are the corresponding side sill and the main floor panel, and side parts of the cross member in the vehicle width direction are supported more rigidly. Thus, the vibrations in the up-down directions can be effectively reduced also at the positions of the side parts in the vehicle width direction. Further, since the cross member supports the floor tunnel from the above, vibrations in the up-down directions of the floor tunnel can also be reduced. As described above, the up-down vibrations of the main floor panel and the rear floor panel can be reduced in the entire vehicle body rear part. As a result, vibrations transmitted to the vehicle cabin and noise can be prevented.

Also, in the floor structure in vehicle body rear part according to the present invention, a first flange extending toward a vehicle front is provided to a lower end part of the central part of the front wall part in the vehicle width direction, a center flange extending toward the vehicle front is provided to the central part of the cross member in the vehicle width direction, the first flange of the front wall part and the center flange of the cross member are arranged on the floor tunnel while overlapping in this order from the top, and three of the floor tunnel, the first flange of the front wall part, and the center flange of the cross member are joined to one another by welding.

According to the present invention, since the cross member is joined to the main floor panel and the rear floor panel together, it is possible to enhance the rigidity of the portion where the main floor panel and the rear floor panel are joined to each other. Also, since the floor tunnel is supported from above by the two members which are the cross member and the rear floor panel, the vibrations in the up-down directions of the floor tunnel can be reduced more effectively.

Moreover, since the cross member joined to the side sills which constitute a skeleton (basic frames) of the vehicle body is also joined to the central portion of the main floor panel in the vehicle width direction, the rigidity of the entire vehicle body rear part can be enhanced.

Further, when being applied from the vehicle front, a load is dispersed from the floor tunnel to the rear floor panel and the cross member. Thus, load dispersion and absorption effects in the vehicle body rear part can be enhanced.

Still further, in the floor structure in vehicle body rear part according to the present invention, a pair of side members extending in the vehicle longitudinal direction are arranged below the main floor panel, each of the pair of side members reaches a position at which a corresponding one of the end parts of the cross member in the vehicle width direction is joined to the main floor panel, and three of the cross member, the main floor panel, and the side member are joined to one another by welding.

According to the present invention, since the main floor panel is joined to the side members and the cross member which constitute the skeleton of the vehicle body, the rigidity of the main floor panel can be enhanced. In addition, since the cross member and the main floor panel are joined to the side members, a load and vibrations in the up-down directions transmitted to the cross member and the main floor panel can be reduced by being absorbed by the side members.

MODE FOR CARRYING OUT THE INVENTION

A floor structure in vehicle body rear part according to an embodiment of the present invention will be now described with reference to the drawings.

Figure 1:
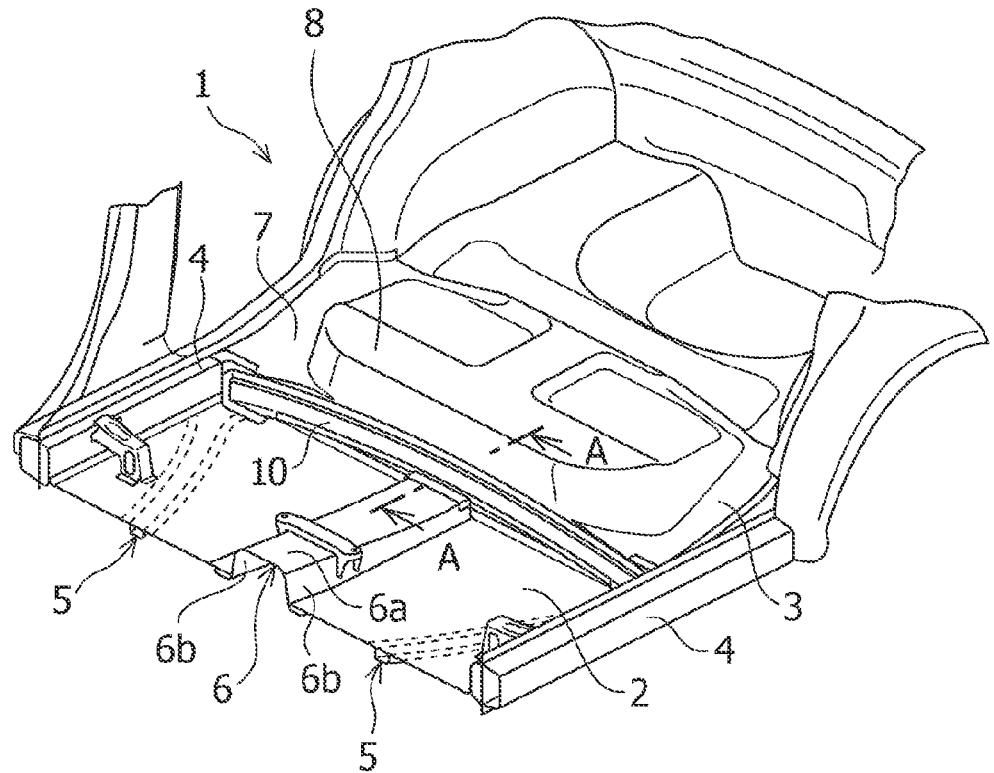
FIG. 1 is a perspective view of a floor structure of vehicle body rear part according to an embodiment of the present invention.
Figure 2:
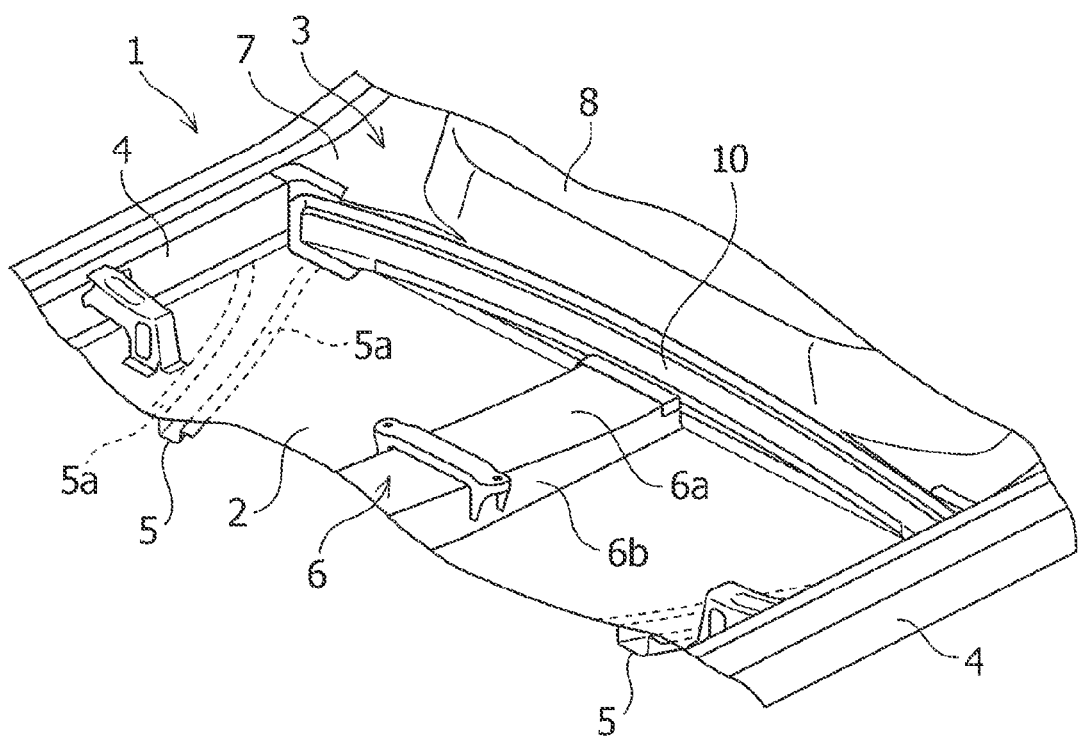
FIG. 2 is an enlarged perspective view of a place at which a rear floor cross member is attached in the floor structure of the vehicle body rear part according to the embodiment of the present invention, which is seen from the vehicle front.
Figure 3:
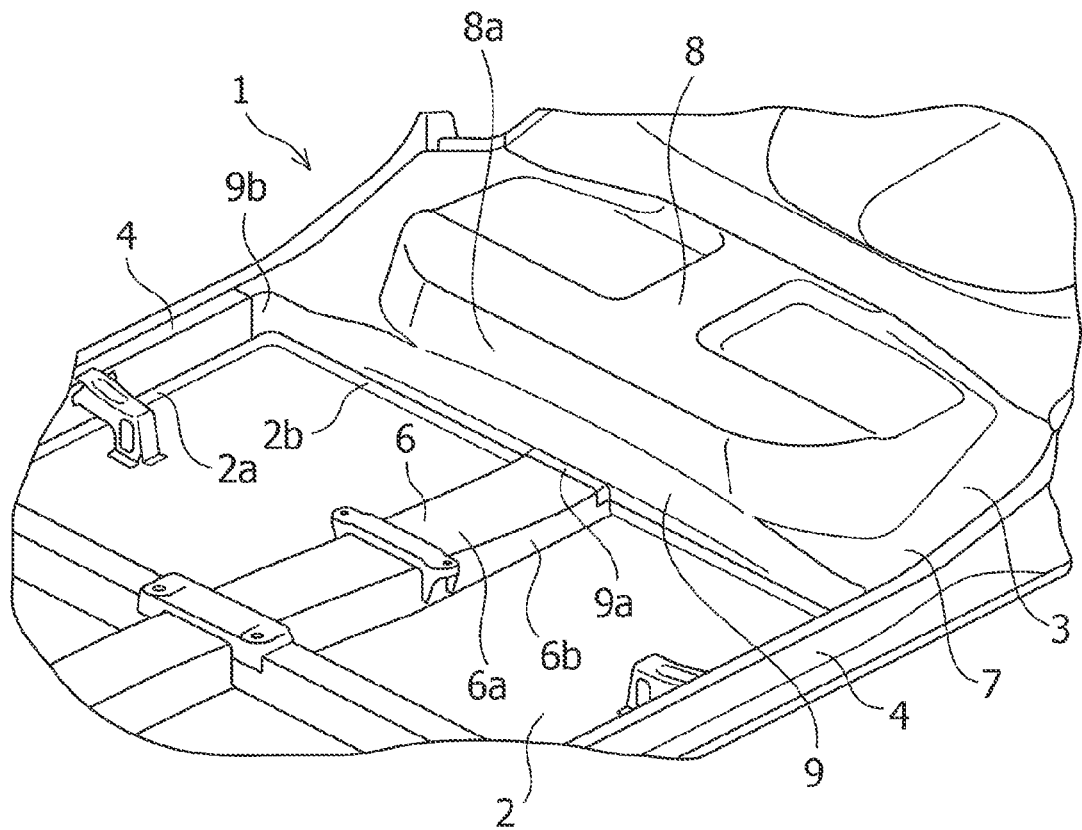
FIG. 3 a perspective view of the floor structure of the vehicle body rear part according to the embodiment of the present invention and shows a state before the rear floor cross member is attached.

As shown in FIGS. 1 to 3, a vehicle body 1 includes a main floor panel 2 and a rear floor panel 3 which form front and rear floors of a vehicle cabin. A pair of side sills 4 extending in a vehicle longitudinal direction are arranged on sides in a vehicle width direction of each of the main floor panel 2 and the rear floor panel 3.

As shown in FIGS. 1 and 2, a pair of side members 5 extending in the vehicle longitudinal direction are arranged below the main floor panel 2. A cross section of each side member 5 has a substantially U-shape with its top opened. As shown in FIG. 2, flange parts 5a extending along a back surface of the main floor panel 2 are respectively provided to end parts of the side member 5 in the vehicle width direction. In addition, as shown in FIGS. 1 and 2, the side member 5 curves while spreading toward the outside in the vehicle width direction, and a rear end part of the side member 5 is connected to a corresponding one of the pair of side sills 4 at a position of a side part of the vehicle body 1 in the vehicle width direction.

As shown in FIGS. 1 to 3, a floor tunnel 6 projecting upward and extending in the vehicle longitudinal direction is provided in a central part of the main floor panel 2 in the vehicle width direction. As shown in FIG. 1, the floor tunnel 6 includes a top surface 6a and side wall surfaces 6b opposed to each other in the vehicle width direction. In addition, as shown in FIG. 3, side end flanges 2a bent upward are provided along side end parts of the main floor panel 2 in the vehicle width direction, and a rear end flange 2b bent upward is provided along a rear end part of the main floor panel 2 in the vehicle longitudinal direction.

As shown in FIGS. 1 to 3, the rear floor panel 3 includes a horizontal surface 7 forming the floor. The horizontal surface 7 of the rear floor panel 3 is provided with a swelling-out part 8 swelling out upward to accommodate a fuel tank (not shown).

As shown in FIG. 3, a front wall part 9 facing (extending toward) the main floor panel 2 is provided to a front end part of the horizontal surface 7 of the rear floor panel 3. The front wall part 9 extends in the vehicle width direction between the pair of side sills 4. As shown in FIG. 3, a central part of the front wall part 9 in the vehicle width direction is continuous from and flush with a vertical wall part 8a located on a front end of the swelling-out part 8.

In addition, as shown in FIG. 3, the front wall part 9 is formed into an arc shape in such a manner that the central part of the front wall part 9 in the vehicle width direction projects upward. As shown in FIGS. 1 and 2, a height in an up-down direction of the front wall part 9 is designed to correspond to a height in an up-down direction of a rear floor cross member 10 to be described later.

As shown in FIG. 3, a first flange 9a extending toward the vehicle front is provided to a lower end part of the central part, in the vehicle width direction, of the front wall part 9 of the rear floor panel 3. The first flange 9a of the front wall part 9 is placed on the top surface 6a of the floor tunnel 6.

In addition, as shown in FIG. 3, second flanges 9b extending toward the vehicle front along the side sills 4 are respectively provided to end parts, in the vehicle width direction, of the front wall part 9 of the rear floor panel 3. Each of the second flanges 9b of the front wall part 9 is arranged along an inner side surface of the corresponding side sill 4. The lower end part except the central part of the front wall part 9 in the vehicle width direction extends downward and is located on the back side (the rear side) of the rear end flange 2b of the main floor panel 2.

Figure 4:
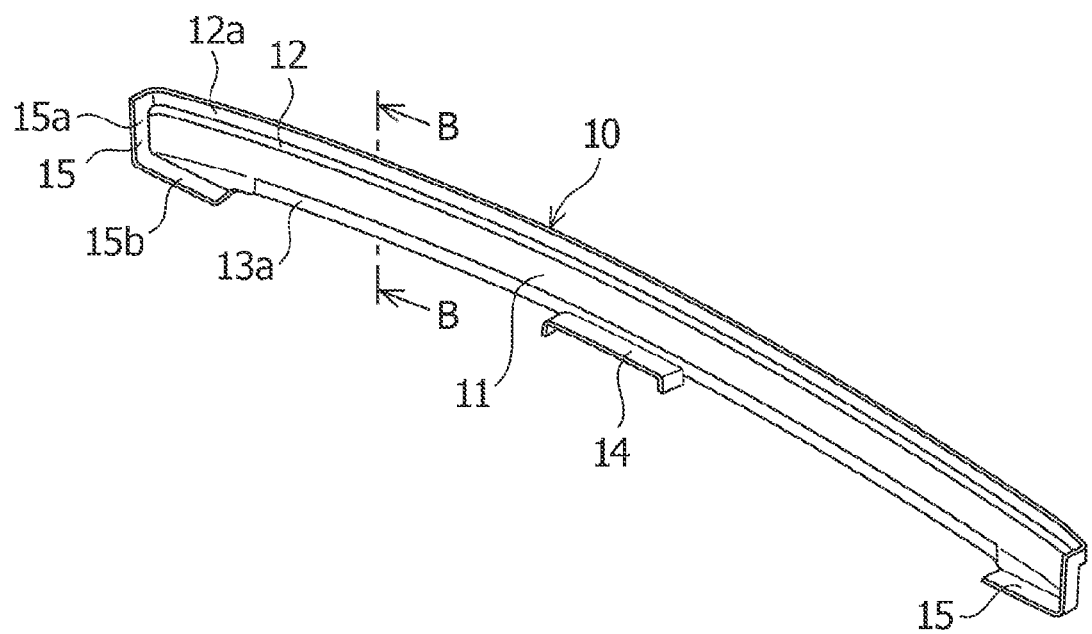
FIG. 4 is a perspective view of the rear floor cross member according to the embodiment of the present invention.

As shown in FIGS. 1 and 2, the rear floor cross member 10 is arranged in a location corresponding to the front wall part 9 of the rear floor panel 3. As shown in FIG. 4, the rear floor cross member 10 is formed into an arc shape in such a manner that a central part thereof in the vehicle width direction projects upward in a vehicle front view. That is, the rear floor cross member 10 is formed in such a manner that the arc shape corresponds to the arc shape of the front wall part 9 while being arranged along the front wall part 9 of the rear floor panel 3.

Figure 5:
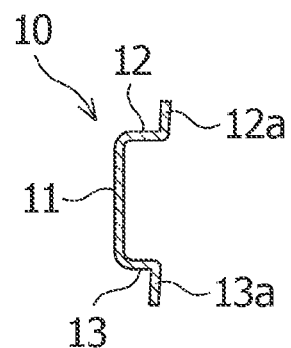
FIG. 5 is a sectional view taken along the B-B line of FIG. 4.

As shown in FIG. 5, the rear floor cross member 10 has a hat shape in cross section projecting toward the vehicle front and includes a front surface 11 extending in the vehicle width direction and an upper wall surface 12 and a lower wall surface 13 which extend from the front surface 11 toward the vehicle rear. The upper wall surface 12 of the rear floor cross member 10 has an upper flange 12a extending upward, while the lower wall surface 13 thereof has a lower flange 13a extending downward.

Figure 6:
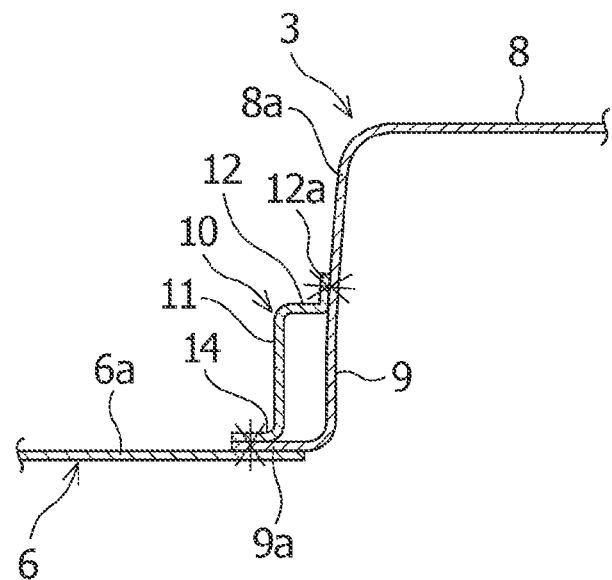
FIG. 6 is a sectional view taken along the A-A line of FIG. 1.

As shown in FIG. 4, a center flange 14 extending toward the vehicle front is provided to a central part, in the vehicle width direction, of the front surface 11 of the rear floor cross member 10. As shown in FIG. 6, the center flange 14 is placed on an upper surface of the first flange 9a of the front wall part 9 of the rear floor panel 3. Accordingly, as shown in FIG. 6, the first flange 9a of the front wall part 9 and the center flange 14 of the rear floor cross member 10 are arranged on the top surface 6a of the floor tunnel 6 while overlapping in this order from the top.

Figure 7:
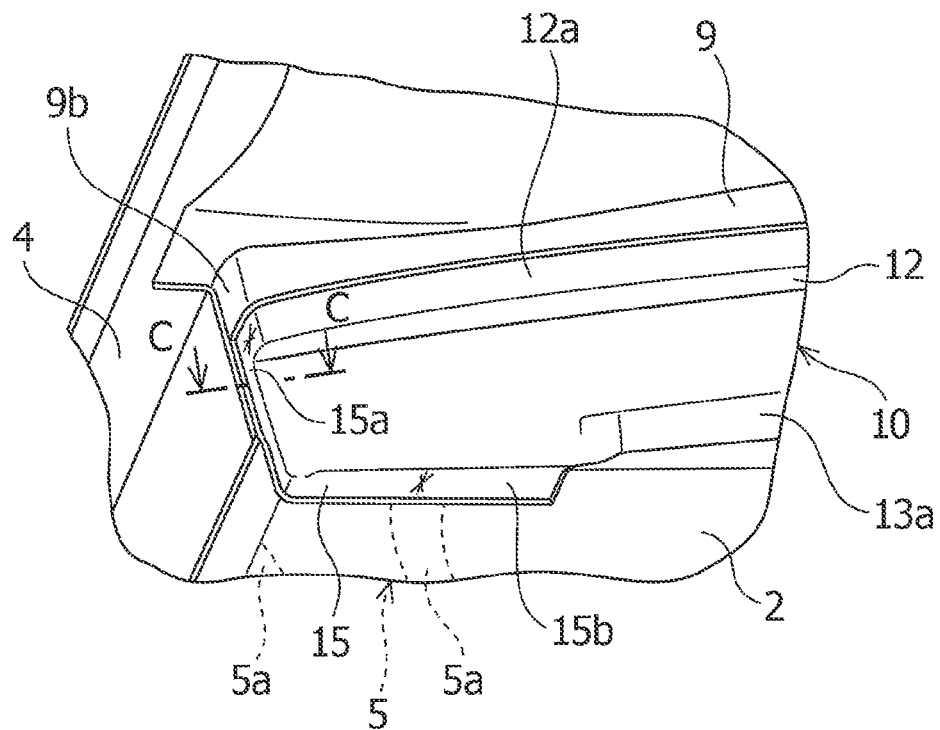
FIG. 7 is an enlarged view of a side part of the rear floor cross member in the floor structure of the vehicle body rear part according to the embodiment of the present invention, which is seen from the vehicle front.

In addition, as shown in FIG. 4, side flanges 15 extending toward the vehicle front are provided to end parts of the rear floor cross member 10 in the vehicle width direction. As shown in FIG. 7, each of the side flanges 15 has an L-shape in the vehicle front view, and includes a first portion 15a extending along the corresponding side sill 4 and a second portion 15b extending along the main floor panel 2.

Next, a description will be given of a joining structure in the floor structure in vehicle body rear part according to this embodiment. Note that welding symbols only required for explanation are shown in the drawings and joining are actually performed in the embodiment in more places than those shown by the symbols.

As shown in FIG. 3, each of the side end flanges 2a of the main floor panel 2 and the inner side surface of the corresponding side sill 4 are joined to each other by welding. The rear end flange 2b of the main floor panel 2 and the lower end part except the central part of the front wall part 9 of the rear floor panel 3 are joined to each other by welding.

Figure 9:
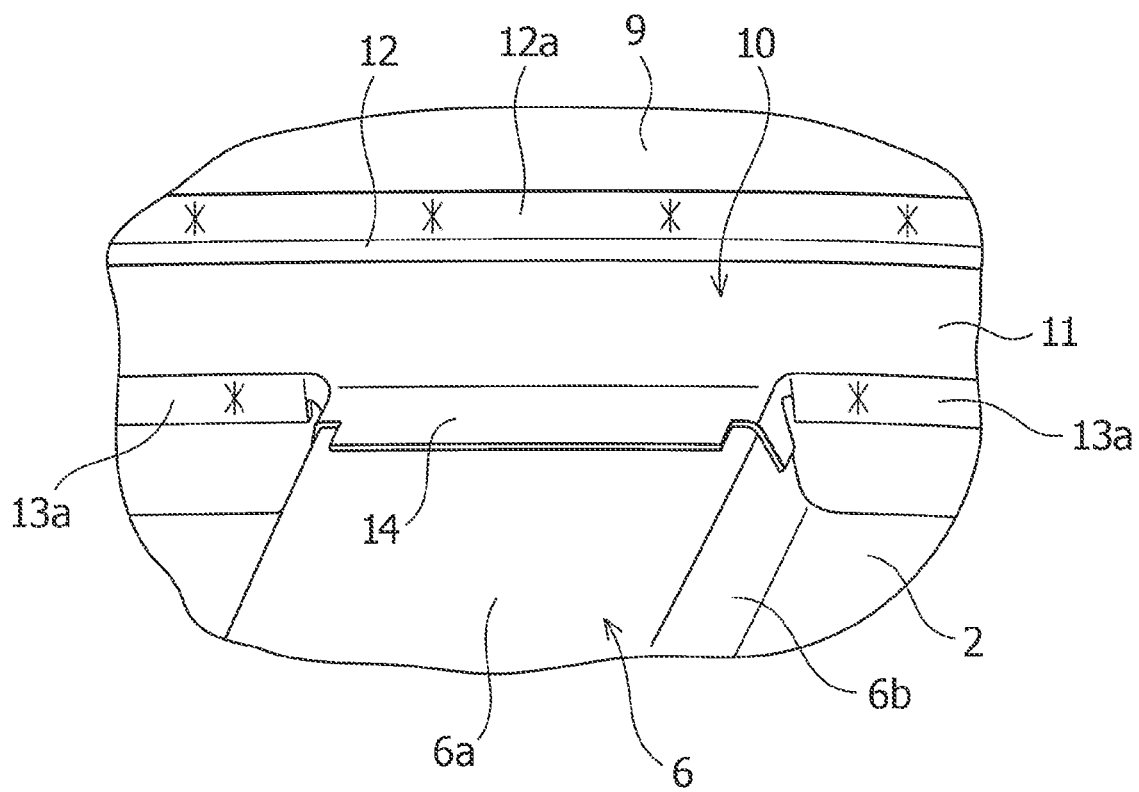
FIG. 9 is an enlarged view of a central part of the rear floor cross member in a vehicle width direction in the floor structure of the vehicle body rear part according to the embodiment of the present invention, which is seen from the vehicle front.

In this embodiment, as shown in FIGS. 6 and 9, the upper flange 12a of the rear floor cross member 10 and the front wall part 9 of the rear floor panel 3 are joined to each other by welding. Also, as shown in FIG. 9, the lower flange 13a of the rear floor cross member 10 and the front wall part of the rear floor panel 3 are joined to each other by welding.

Moreover, as shown in FIG. 6, the three of the center flange 14 of the rear floor cross member 10, the first flange 9a of the front wall part 9 of the rear floor panel 3, and the top surface 6a of the floor tunnel 6 are joined to one another by welding.

Figure 8:
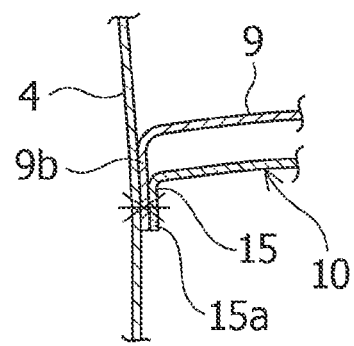
FIG. 8 is a sectional view taken along the C-C line of FIG. 7.

Further, as shown in FIG. 8, the three of the first portion 15a of the side flange 15 of the rear floor cross member 10, the second flange 9b of the front wall part 9, and the side sill 4 are joined to one another by welding.

Meanwhile, as shown in FIG. 7, the rear end part of the side member 5 reaches the second portion 15b of the side flange 15 of the rear floor cross member 10. In this embodiment, as shown in FIG. 7, the three of the flange part 5a of the side member 5, the main floor panel 2, and the second portion 15b of the side flange 15 of the rear floor cross member 10 are joined to one another by welding.

In the floor structure in vehicle body rear part according to this embodiment as described above, the front wall part 9 extending between the pair of side sills 4 provided to the front end part, in the vehicle longitudinal direction, of the horizontal surface 7 of the rear floor panel 3. The front wall part 9 is formed into the arc shape in such a manner that the central part thereof in the vehicle width direction projects upward in the vehicle front view. The lower end part except the central part of the front wall part 9 in the vehicle width direction is joined to the rear end flange 2b of the main floor panel 2. The rear floor cross member 10 is formed into the arc shape in such a manner that the central part thereof in the vehicle width direction projects upward in the vehicle front view. The rear floor cross member 10 is arranged in such a manner as to extend along the front wall part 9. The center flange 14 in the central part in the vehicle width direction of the rear floor cross member 10 is placed on the floor tunnel 6. The side flanges 15 on the end parts of the rear floor cross member 10 in the vehicle width direction are joined to the pair of side sills 4 and the main floor panel 2. The center flange 14 of the rear floor cross member 10 is joined to the floor tunnel 6.

According to this embodiment, the main floor panel 2 and the rear floor panel 3 are directly joined to each other, and the rear floor cross member 10 having the same shape as that of the front wall part 9 of the rear floor panel 3 is arranged along the front wall part 9. Thus, the rear floor cross member 10 and the front wall part 9 of the rear floor panel 3 enhance the rigidity in cooperation with each other, and thereby it is possible to reduce deformation occurring when a load is applied to a portion where the main floor panel 2 and the rear floor panel 3 are joined to each other.

In addition, since the front wall part 9 of the rear floor panel 3 and the rear floor cross member 10 are formed into the arc shape projecting upward in the vehicle front view, the rear floor cross member 10 and the front wall part 9 of the rear floor panel 3 can reduce, in cooperation with each other, vibrations in the up-down directions of the main floor panel 2 and the rear floor panel 3. Besides, each end part of the rear floor cross member 10 in the vehicle width direction is joined to the two members which are the corresponding side sill 4 and the main floor panel 2, and side parts of the rear floor cross member 10 in the vehicle width direction are supported more rigidly. Thus, the vibrations in the up-down directions can be effectively reduced also at the positions of the side parts in the vehicle width direction. Further, since the rear floor cross member 10 supports the floor tunnel 6 from the above, vibrations in the up-down directions of the floor tunnel 6 can also be reduced. As described above, the up-down vibrations of the main floor panel 2 and the rear floor panel 3 can be reduced in the entire vehicle body rear part. As a result, vibrations transmitted to the vehicle cabin and noise can be prevented.

Also, in the floor structure in vehicle body rear part according to this embodiment, the first flange 9a extending toward the vehicle front is provided to the lower end part of the central part, in the vehicle width direction, of the front wall part 9 of the rear floor panel 3. The center flange 14 extending toward the vehicle front is provided to the central part of the rear floor cross member 10 in the vehicle width direction. The first flange 9a of the front wall part 9 and the center flange 14 of the rear floor cross member 10 are arranged on the top surface 6a of the floor tunnel 6 while overlapping in this order from the top. The three of the center flange 14 of the rear floor cross member 10, the first flange 9a of the front wall part 9 of the rear floor panel 3, and the top surface 6a of the floor tunnel 6 are joined to one another by welding.

According to this embodiment, since the rear floor cross member 10 is joined to the main floor panel 2 and the rear floor panel 3 together, it is possible to enhance the rigidity of the portion where the main floor panel 2 and the rear floor panel 3 are joined to each other. Also, since the floor tunnel 6 is supported from above by the two members which are the rear floor cross member 10 and the front wall part 9 of the rear floor panel 3, the vibrations in the up-down directions of the floor tunnel 6 can be reduced more effectively.

Moreover, since the rear floor cross member 10 joined to the side sills 4 which constitute a skeleton (basic frames) of the vehicle body is also joined to the central portion (floor tunnel 6) of the main floor panel 2 in the vehicle width direction, the rigidity of the entire vehicle body rear part can be enhanced.

Further, when being applied from the vehicle front, a load is dispersed from the floor tunnel 6 to the rear floor panel 3 and the rear floor cross member 10. Thus, load dispersion and absorption effects in the vehicle body rear part can be enhanced.

Further, in the floor structure in vehicle body rear part according to this embodiment, the pair of side members 5 extending in the vehicle longitudinal direction are arranged below the main floor panel 2. In addition, the rear end part of each side member 5 reaches the corresponding second portion 15b of the side flange 15 of the rear floor cross member 10, and the three of the flange part 5a of the side member 5, the main floor panel 2, and the second portion 15b of the side flange 15 of the rear floor cross member 10 are joined to one another by welding.

According to this embodiment, since the main floor panel 2 is joined to the side members 5 and the rear floor cross member 10 which constitute the skeleton (the basic frames) of the vehicle body, the rigidity of the main floor panel 2 can be enhanced. In addition, since the side members 5 and the main floor panel 2 are joined to the rear floor cross member 10, a load and vibrations in the up-down directions transmitted to the rear floor cross member 10 and the main floor panel 2 can be reduced by being absorbed by the side members 5.

Further, in the floor structure in vehicle body rear part according to this embodiment, the three of the first portion 15a of the side flange 15 of the rear floor cross member 10, the second flange 9b of the front wall part 9, and the side sill 4 are joined to one another by welding.

According to this embodiment, since the rear floor cross member 10 and the rear floor panel 3 are joined to the side sills 4 constituting the skeleton of the vehicle body, the load transmitted to the rear floor cross member 10 and the rear floor panel 3 and the vibrations in the up-down directions can be reduced by being received by the side sills 4.

The above is a description of the embodiment of the present invention. The present invention is not limited to the embodiment, and various modifications and changes can be made based on the technical concept of the present invention.

In the aforementioned embodiment, the three of the flange part 5a of the side member 5, the main floor panel 2, and the second portion 15b of the side flange 15 of the rear floor cross member 10 are joined to one another by welding.

However, the structure in which the side member 5 and the rear floor cross member 10 are joined to each other is not limited thereto. For example, the side member 5 may be extended to a back surface of the side sill 4 to join the side member 5, the first portion 15a of the side flange 15, and the side sill 4 to one another. Alternatively, the side member 5 may be extended to a back surface of the front wall part 9 to join the side member 5, the front wall part 9, and the rear floor cross member 10 to one another.

EXPLANATION OF THE REFERENCE NUMERALS 1 vehicle body
2 main floor panel 3 rear floor panel
4 side sill
5 side member
6 floor tunnel
6a top surface of floor tunnel
6b side wall surface of floor tunnel
7 horizontal surface of rear floor panel
8 swelling-out part of rear floor panel
9 front wall part of rear floor panel
10 rear floor cross member
11 front surface of rear floor cross member
12 upper wall surface of rear floor cross member
13 lower wall surface of rear floor cross member
14 center flange of rear floor cross member
15 side flange of rear floor cross member

What is claimed is:

1. A floor structure in a vehicle body rear part comprising:
a pair of side sills extending in a vehicle longitudinal direction respectively arranged on sides, in a vehicle width direction, of a main floor panel and a rear floor panel which form front and rear floors of a vehicle cabin,
a floor tunnel projecting upward extends in the vehicle longitudinal direction at a central part of the main floor panel in the vehicle width direction,
a front end part of the rear floor panel in the vehicle longitudinal direction is connected to a rear end part of the main floor panel, and
a cross member extending between the pair of side sills is arranged at a position at which the main floor panel and the rear floor panel are connected,
wherein
the front end part of the rear floor panel in the vehicle longitudinal direction includes a front wall part extending between the pair of side sills, the front wall part formed into an arc shape whose central part in the vehicle width direction projects upward in a vehicle front view, and having a lower end part joined to the rear end part of the main floor panel, and
wherein the cross member is formed into an arc shape whose central part in the vehicle width direction projects upward in the vehicle front view, and is arranged to extend along the front wall part with the central part of the cross member in the vehicle width direction placed on the floor tunnel, end parts of the cross member in the vehicle width direction are joined to the pair of side sills and the main floor panel, and the central part of the cross member in the vehicle width direction is joined to the floor tunnel.

2. The floor structure in vehicle body rear part according to claim 1,
wherein a lower end of the central part of the front wall part in the vehicle width direction includes a first flange extending toward a vehicle front,
wherein the central part of the cross member in the vehicle width direction includes a center flange extending toward the vehicle front,
wherein the first flange of the front wall part and the center flange of the cross member are arranged on the floor tunnel while overlapping in this order from the top, and
wherein a rear part of the floor tunnel, a front part of the first flange of the front wall part, and a front part of the center flange of the cross member are joined to one another by welding.

3. The floor structure in vehicle body rear part according to claim 1,
wherein a pair of side members extending in the vehicle longitudinal direction are arranged below the main floor panel,
wherein each of the pair of side members has an end part which reaches a position at which a corresponding one of the end parts of the cross member in the vehicle width direction is joined to an edge of the main floor panel, and
wherein the end part of the cross member, the edge of the main floor panel, and the end part of the side member are joined to one another by welding.

4. The floor structure in vehicle body rear part according to claim 2,
wherein a pair of side members extending in the vehicle longitudinal direction are arranged below the main floor panel,
wherein each of the pair of side members has an end part which reaches a position at which a corresponding one of the end parts of the cross member in the vehicle width direction is joined to an edge of the main floor panel, and
wherein the end part of the cross member, the edge of the main floor panel, and the end part of the side member are joined to one another by welding.

* * * * *